United States Patent
Krossoy et al.

(10) Patent No.: US 11,985,207 B2
(45) Date of Patent: May 14, 2024

(54) AGGREGATING SERVER AND METHOD FOR FORWARDING NODE DATA

(71) Applicant: ABB Schweiz AG, Baden (CH)

(72) Inventors: Frode Krossoy, Stord (NO); Roland Braun, Niederkassel Luelsdorf (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/495,838

(22) Filed: Oct. 7, 2021

(65) Prior Publication Data
US 2022/0030083 A1    Jan. 27, 2022

Related U.S. Application Data

(63) Continuation of application No. PCT/EP2020/060202, filed on Apr. 9, 2020.

(30) Foreign Application Priority Data

Apr. 10, 2019  (EP) ..................................... 19168405

(51) Int. Cl.
*H04L 67/566* (2022.01)
*H04L 67/1095* (2022.01)
(Continued)

(52) U.S. Cl.
CPC ........ *H04L 67/566* (2022.05); *H04L 67/1095* (2013.01); *H04L 67/2876* (2013.01); *H04L 67/563* (2022.05)

(58) Field of Classification Search
CPC ............ H04L 67/2833; H04L 67/1095; H04L 67/2814; H04L 67/2876; H04L 67/563; H04L 67/566
See application file for complete search history.

(56) References Cited

U.S. PATENT DOCUMENTS 6,782,276 B1   8/2004  Lam et al.
7,912,902 B2   3/2011  Cheng et al.
(Continued)

FOREIGN PATENT DOCUMENTS

CN   101247391 A   8/2008
CN   101893861 A   11/2010
(Continued)

OTHER PUBLICATIONS

Ikka Seilonen et al., "Aggregating OPC UA servers for monitoring manufacturing systems and mobile work machines," 2016 IEEE 21st International Conference on Emerging Technologies and Factory Automation (ETFA), Sep. 2016, pp. 1-4, IEEE, Berlin, Germany.
(Continued)

*Primary Examiner* — Emmanuel L Moise
*Assistant Examiner* — Xiang Yu
(74) *Attorney, Agent, or Firm* — Leydig, Voit & Mayer, Ltd.

(57) ABSTRACT

An aggregating server includes a control logic, a first proxy node, and a second proxy node in an aggregated address space The first proxy node corresponds to a first node in a remote address space of an aggregated server, and the second proxy node corresponds to a second node in the remote address space of the aggregated server. The control logic is configured to forward node data from the first node in the remote address space via the first proxy node and the second proxy node to the second node in the remote address space according to an input/output relationship.

8 Claims, 2 Drawing Sheets

(51) Int. Cl.
*H04L 67/2876* (2022.01)
*H04L 67/563* (2022.01)

(56) References Cited

U.S. PATENT DOCUMENTS

| | | | |
|---|---|---|---|
| 9,602,405 B1 | 3/2017 | Sharma et al. | |
| 2005/0033808 A1 | 2/2005 | Cheng et al. | |
| 2005/0144269 A1 | 6/2005 | Banatwala et al. | |
| 2007/0067458 A1* | 3/2007 | Chand | G06F 16/258 709/226 |
| 2013/0212160 A1* | 8/2013 | Lawson | G06F 16/9535 709/203 |
| 2014/0047107 A1* | 2/2014 | Maturana | G05B 19/056 709/224 |
| 2015/0033365 A1* | 1/2015 | Mellor | G06F 8/71 726/29 |
| 2018/0309831 A1* | 10/2018 | Sherman | H04L 67/125 |

FOREIGN PATENT DOCUMENTS

| | | |
|---|---|---|
| CN | 101971184 A | 2/2011 |
| CN | 106815151 A | 6/2017 |
| CN | 107409121 A | 11/2017 |
| CN | 108199897 A | 6/2018 |
| CN | 109313571 A | 2/2019 |
| JP | 2017-120671 A | 7/2017 |
| JP | 2018-106688 A | 7/2018 |
| WO | WO 2005/109125 A1 | 11/2005 |
| WO | 2018/194222 A1 | 10/2018 |

OTHER PUBLICATIONS

Joona Elovaara, "Aggregating OPC UA Server for Remote Access to Agricultural Work Machines," Aug. 2015, pp. 1-75, Aalto University Schools of Technology, Espoo, Finland.

Japan Patent Office, Office Action in Japanese Patent Application No. 2021-559866, 6 pp. (dated Jan. 24, 2023).

Chen et al., "Design and implementation of OPC proxy server in remote monitoring system," *J. of Computer Applications*, 29(6): 3 pp. (Jun. 2009).

Großmann et al., "Opc Ua Server Aggregation - The Foundation for an Internet of Portals," *Proceedings of the 2014 IEEE Emerging Technology and Factory Automation* (ETFA), 6 pp. (Sep. 16-19, 2014).

China National Intellectual Property Administration, Office Action in Chinese Patent Application No. 202080027150.5, 29 pp. (Dec. 22, 2023).

* cited by examiner

AGGREGATING SERVER AND METHOD FOR FORWARDING NODE DATA

CROSS-REFERENCE TO PRIOR APPLICATIONS

This application is a continuation of International Patent Application No. PCT/EP2020/060202, filed on Apr. 9, 2020, which claims priority to European Patent Application No. EP 19168405.9, filed on Apr. 10, 2019. The entire disclosure of both applications is hereby incorporated by reference herein.

FIELD

One or more embodiments of the present invention may relate to an Aggregating Server in an Open Platform Communications Unified Architecture (OPC UA), a controller, a method for forwarding node data of a first node in a remote address space to a second node in a remote address space, a computer program element and a computer-readable medium.

BACKGROUND

OPC UA is a standard specification defining communication of on-line data from various devices from different manufacturers. Future Distributed Control Systems (DCS) will run on OPC UA-connected devices. OPC UA is a platform-independent, service oriented client-server architecture, which transports machine data as control values, measurement values and parameters, and describes the machine data semantically.

UA servers receive and expose information, such as sensor data, from a device. A UA server supports information models, which define, how the information is typed and classified. The representation of this information is called the servers address space. UA clients are applications that connect to UA servers. Clients are used, for example, to find information from the server's address space, to read and write server data, to subscribe to certain changes such as data changes, or events such as alarms, and to call server methods. The communication between clients and servers is handled by services. The address space is the actual representation of the information that a UA server exposes. It is formed by nodes and references, which can be explored and displayed by a UA client. A node may be compared to an object in object-oriented programming languages. A node comprises attributes, methods, and events. Attributes can have values, which can be read, methods are called by a command, and events can be sent to exchange certain information between devices. Events are alarms and conditions, occurring e.g. at a data changes. An event comprises a reception time stamp, a message and a degree of severity. References are used to relate nodes to each other and attributes are used to describe a node. The information model is based on the nodes.

An OPC-UA system may be organized according to an aggregation architecture. An aggregation architecture comprises aggregated servers and aggregation servers, also referred to as aggregating servers in this disclosure.

Aggregated servers represent the entities of the automation system. These are the underlying servers which may either represent a single component (e.g., a field device) or a subsystem that consists of a set of components, parts of the automation system or the entire automation system. The nodes that are created and managed by the aggregated servers form the remote address space. The counterpart to the remote address space is the aggregated address space, which is formed by the nodes in the aggregating server.

The aggregation server is the core of the aggregation architecture. It connects to underlying servers via OPC UA services and aggregates their type, instance and structure information. Thus, a single server can be used to connect to multiple other servers and to represent their information in a unified manner. This way, a client connecting to the server can access the data of multiple servers from a single source.

The aggregated nodes in the aggregation server are images of the remote nodes of the aggregated servers. In this disclosure, these nodes are also referred to as "proxy nodes".

The aggregation node manager is the central singleton that manages the nodes in the address space of the aggregation server. The OPC UA client provides functionality to connect to aggregated servers and to access nodes in the address space of the aggregated server. The aggregation node manager creates one OPC UA client per underlying server and then browses each underlying server with the help of the respective clients. The node manager forwards all requests (read, write, subscribe etc.)

Especially for realizing highly or full automated processes, node data contained in a first node may be needed by another node. E.g., a measurement value collected by a sensor has to be provided to a controller of an actuator. In a conventional system of OPC UA servers an OPC UA client is needed to drive the data exchange among OPC UA servers. An aggregating server as it is known by today simply forwards service requests from a connected OPC UA client to any of the aggregated servers.

There may be a desire to exchange data on a short way between aggregated servers without involvement of a client and without the need of forwarding service requests, so that a fast and economic data exchange is achieved.

SUMMARY

In an embodiment, the present invention may provide an aggregating server that includes a control logic, a first proxy node, and a second proxy node in an aggregated address space, where the first proxy node corresponds to a first node in a remote address space of an aggregated server, and the second proxy node corresponds to a second node in the remote address space of the aggregated server, where the control logic is configured to forward node data from the first node in the remote address space via the first proxy node and the second proxy node to the second node in the remote address space according to an input/output relationship.

In an embodiment, the present invention may provide a controller for use in an aggregating server. The controller may include a control logic node, a first interface node and a second interface node, where the first interface node is assigned to a first proxy node, the second interface node is assigned to a second proxy node; and where the control logic node is configured to forward node data from the first proxy node to the second proxy node according to an input/output relationship between the first interface node and the first proxy node and an input/output relationship between the second interface node and the second proxy node.

In an embodiment, the present invention may provide a method for forwarding node data of a first node in a remote address space to a second node in the remote address space. The method may include:

S1: aggregating, by an aggregating server, node data of the first node and the second node;

S2: creating, by the aggregating server, a first proxy node including node data of the first node, and a second proxy node including node data of the second node;

S3: receiving node data from the first proxy node at a first interface node, by the aggregating server, according to an input/output relationship included in the first proxy node between the first proxy node and the first interface node;

S4: providing, by the aggregating server, the node data of the first interface node to a second interface node; and S5: forwarding, by the aggregating server, the node data of the first interface node to the second proxy node and the second node, according to the input/output relationship between the second interface node and the second proxy node and a reference defining a relationship between the first proxy node and the second proxy node.

A problem may be solved by the subject-matter of the independent claims. Embodiments are provided by the dependent claims, the following description and the accompanying figures.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
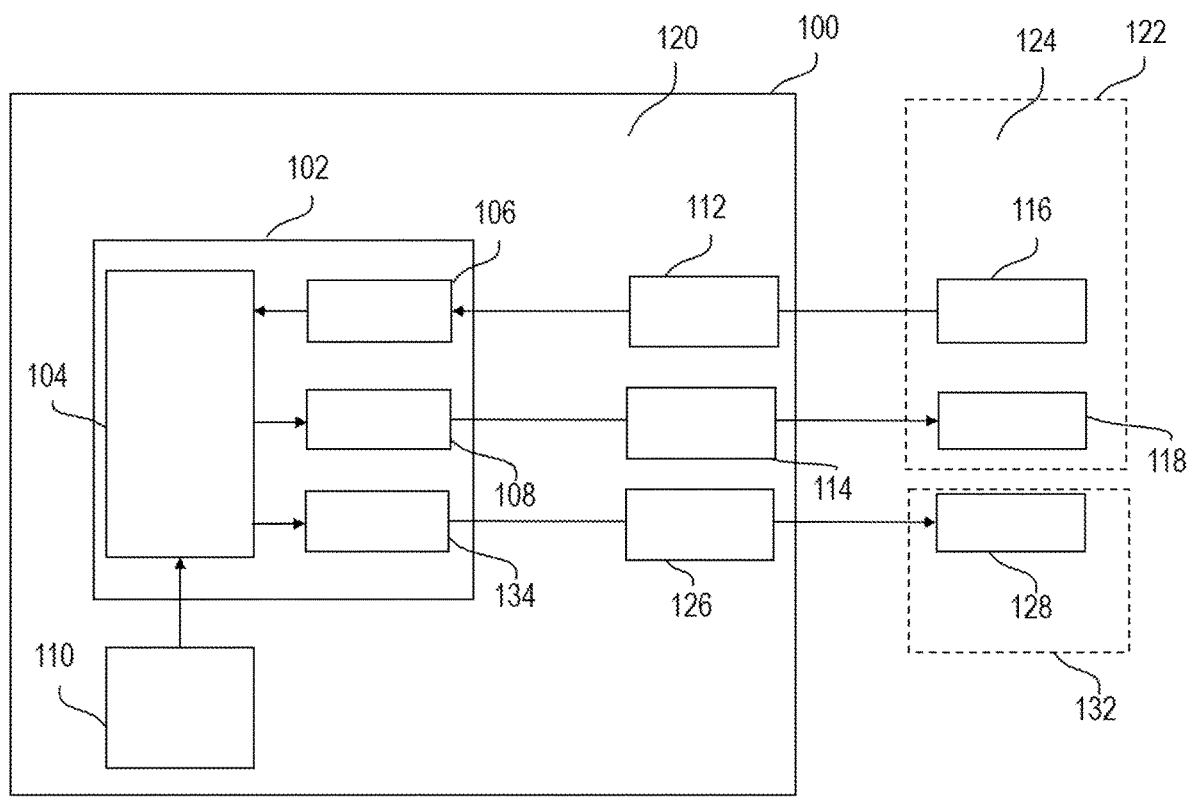
FIG. 1 shows a block diagram of an aggregation server and a controller according to an embodiment.

The described embodiments similarly pertain to the aggregation server, the controller, the method for forwarding node data, the computer program element and the computer-readable medium. Synergetic effects may arise from different combinations of the embodiments although they might not be described in detail.

Further on, it shall be noted that all embodiments of the present invention concerning a method, might be carried out with the order of steps as described, nevertheless this has not to be the only and essential order of steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to an aspect, an aggregating server is provided. The aggregating server comprises a control logic and proxy nodes in the aggregated address space. A first proxy node corresponds to a first node in a remote address space of an aggregated server, and a second proxy node corresponds to a second node in the remote address space of an aggregated server. The control logic is configured to forward node data from the first node in the remote space via the first proxy node and further via the second proxy node to the second node in the remote space according to a input/output relationship.

In other words, the aggregating server is configured to run a logic-controlled data forwarding process, that forwards node data of a first node of an aggregated server in the remote address space to a second node of this or another aggregated server in the remote address space. The forwarding is executed by the control logic, that receives node data from a first proxy node, which is an image of the first node in the remote address space and provides the data to the second proxy node and therefore to the second node in the remote address space. The control logic is represented, i.e., integrated in the address space of the aggregation server. The control logic is programmed inside the address space of the aggregation server.

According to an embodiment, the control logic comprises a control logic node, that is configured to receive the node data from the first proxy node via the first interface node and to forward the node data to the second proxy node according to an input/output relationship.

Thus, a specific control node may provide or support the service for receiving and transmitting the node data to be forwarded. The control logic node may further provide information to manipulate node data to be forwarded and the control logic may provide routines to process the data, either by routines implemented into the control logic or by external routines, where the control logic provides the interface to call the routines. For example, the node data to be forwarded may be filtered, so that averaged values, smoothed values or unit converted values with respect to physical units are obtained before forwarding, According to an embodiment, further comprises a synchronization module. The control logic is configured to synchronize the node data of the first proxy node with the node data of the first node in the remote address space before the forwarding is executed; and to provide the node data to the second proxy node when the forwarding is executed.

In OPC UA, data changes of the nodes of the aggregated servers are monitored by the aggregation server when a client has subscribed to a node. When a data change is noticed, the aggregation server first synchronizes the node in the remote address space with its corresponding proxy node and forwards then the up-to-date node data via the control logic to the second proxy node and further to the node in the remote address space corresponding to the second proxy node. Thus, since the aggregating server knows the nodes in the aggregated address space, which are proxies of nodes in the remote address space, the aggregating server can synchronize the proxy nodes with their respective counterparts in the address spaces on remote.

According to an embodiment, the first proxy node and the second proxy node comprise a data type definition; wherein the data type is read or write; wherein the input/output relationship between an interface node and a proxy node is defined by the read- or write data type of a proxy node data, and the data type of the first proxy node is a read data type and the and the data type of the second proxy node is a write data type; wherein further a reference in the aggregating address space defines a relationship between the first proxy node and the second proxy node; and wherein the first proxy node is defined as forwarding source of the node data to be forwarded according to the input/output relationship between the first interface node and the first proxy node, and the reference; and wherein the second proxy node is defined as forwarding target of the node data to be forwarded according to the input/output relationship between the second interface node and the second proxy node, and the reference.

The data type definition thus defines whether the data is to be read by an interface node and the data is thus input data for the interface node or whether data is to be written into the proxy node and the data to be forwarded is output data from the interface node. Therefore, the data types defines the relationship between an interface node and the proxy node. References are used for relating a proxy node as the first proxy node to other proxy nodes, as e.g., the second proxy node. References thus provide the information, which proxy nodes are related to each other, and the data type provides the information, how, i.e., in which direction they are connected with each other. Advantageously, exactly one read data type and one or several write data types are admitted for a reference which connects nodes to each other for forwarding node data.

Thus, configurable input relationships and output relationships between the proxy nodes and the interface nodes allow for forwarding the node data flexibly. An interface node may comprise variables and attributes, that reflect the relationship to a proxy node, and it may comprise a method for receiving data from a proxy node or transmitting data to the proxy node, depending on the configuration. Alternatively, the control logic uses the interface node data and provides the methods for receiving and transmitting the data to be forwarded. For each proxy node an input interface node and an output interface node may exist. Assigning an input interface node to a first proxy node and a corresponding and synchronized output interface node to a second proxy node allows for a relation between a first and a second proxy node. Thereby, the term "synchronized" means that the data received at the input of this interface node is provided to the corresponding output interface node. Thus, a further proxy node may be assigned to this output interface node, so that the data of the first node and proxy node, respectively, is forwarded to both, the second proxy node and the further proxy node.

According to an embodiment, the aggregating server further comprises an input-output configuration file. The input-output configuration file comprises the input relationship between the first proxy node and the first interface node and the output relationship between the second interface node and the second proxy node. The control logic is configured to read the input relationship and the output relationship from the input-output configuration file and to forward the node data from the first node to the second node according to the input relationship and the output relationship. Alternatively, a console may be connected to the control logic, and the file may be provided by sending it over the console to the control logic, or the configuration may be directly changed via the console. The console may be a console of a client connected to the aggregating server.

Therefore, the file-described input/output relations tell the aggregating server how to synchronize values between proxy nodes as it describes the relation between proxy nodes and interface nodes.

According to an embodiment, the aggregating server is an OPC UA aggregating server. An OPC UA aggregating server is an OPC UA server configured to aggregate further OPC UA server and is configured to provide services for the aggregation, creation of the aggregated address space, browsing the further OPC UA servers for nodes to be aggregated, provide a consolidated view on aggregated address spaces for connected clients, forward and synchronize node data between aggregated address spaces, and to monitor values and events from remote address spaces.

According to an aspect, a controller in an aggregating server is provided. The controller comprises a control logic node, a first interface node and a second interface node, wherein the first interface node is assigned to a first proxy node, the second interface node is assigned to a second proxy node; and wherein the control logic node is configured to forward node data from the first proxy node to the second proxy node according to an input/output relationship between the first interface node and the first proxy node and an input/output relationship between the second interface node and the second proxy node. The controller may be a dedicated hardware, firmware or may be partly or totally be a software running on a hardware logic, a controller or a processor. The interface nodes and the proxy nodes can be regarded as data objects including, e.g., a variable or data item, attributes and meta information in a memory, to which a routines for reading or writing are applied. The attributes and the meta information especially describe the variable or the meaning the value, whether it is a variable whose value is to be read or to be written, etc. The read/write permissions of the proxy node variables define if the assigned, i.e., connected interface node is an input or an output interface node. In general, the nodes, or more exactly the hardware in which the nodes are held, can be a spatially distributed hardware.

According to an example, the logical connection between the first proxy node and the second proxy node, and thus the logical connection between the first input node and the second input node is defined by a reference. The reference may be stored in the first proxy node and in the second proxy node. Alternatively, the reference is stored in a reference node or is read from a configuration file. The controller has thus all information to identify the source and the one or more destinations. It is then capable to forward the node data as, e.g., the value of the variable, of the first proxy node to the second proxy node. Preferably, there is exactly one input interface node, which is connected to an proxy node comprising a variable with read permission and one or more output nodes, each connected to a respective proxy node comprising a variable with write permission.

According to an aspect, a method for forwarding node data of a first node in a remote address space to a second node in a remote address space is provided. The method comprises the following steps:

S1: Aggregating, by an aggregating server, node data of the first node and the second node.

S2: Creating, by the aggregating server, a first proxy node comprising node data of the first node, and a second proxy node comprising node data of the second node.

S3: Receiving node data from the first proxy node at a first interface node, by an aggregating server, according to an input/output relationship included in the first proxy node between the first proxy node and the first interface node S4: providing, by the aggregating server, the node data of the first interface node to a second interface node;

S5: forwarding, by the aggregating server, the node data of the first interface node to the second proxy node and the second node, according to the input/output relationship between the second interface node and the second proxy node and a reference defining a relationship between the first proxy node and the second proxy node.

According to an embodiment, step S2, i.e., creating, by the aggregating server, a first proxy node comprising node data of the first node, and a second proxy node comprising node data of the second node, the method further comprises steps:

S2a: determining a relation between the first proxy node and the second proxy node by reading reference information; S2b: determining the input/output relationship by reading and evaluating meta information of the first proxy node; the meta information describing a read permission; S2c: determining the input/output relationship by reading and evaluating meta information of the second proxy node; the meta information describing a write permission.

According to an embodiment, step S3, i.e., receiving node data from the first proxy node at a first interface node, by an aggregating server, according to an input/output relationship included in the first proxy node between the first proxy node and the first interface node, comprises step:

S3a: detecting a data change at the first node and upon the detection of the data change performing step: S3b: synchronizing the first node with the first proxy node and triggering receiving node data from the first proxy node at a first interface node, by an aggregating server, according to an input/output relationship included in the first proxy node between the first proxy node and the first interface node.

According to an aspect, a computer program element is provided, which when being executed by the control logic, instructs an aggregating server, such as an aggregating server or an OPC UA aggregating server as described above to perform steps S2 to S5 as described above. The computer program element may be part of a computer program, but it can also be an entire program by itself. For example the computer program element may be used to update an already existing computer program to get to one or more embodiments of the present invention.

According to an aspect, a computer readable medium is provided, on which a program element according to claim 10 is stored. The computer readable medium may be seen as a storage medium, such as for example, a USB stick, a CD, a DVD, a data storage device, a hard disk, or any other medium on which a program element as described above can be stored.

FIG. 1 shows a block diagram of an aggregating server 100 comprising a control logic 102 and proxy nodes 112 in the aggregated address space 120. A first proxy node 112 corresponds to a first node 116 in a remote address space 112 of an aggregated server 122, and a second proxy node 114 corresponds to a second node 118 in the remote address space 124 of an aggregated server 122. The control logic 102 comprises a control logic node 104 and the control logic node 104 is configured to forward node data from the first node 116 in the remote space 124 via the first proxy node 112 and the second proxy, control logic interface 118 node 114 to the second node 118 in the remote space 118 according to a input/output relationship.

During its start phase, the aggregating server 100 creates a consolidated image of any of the address spaces of other aggregated OPC UA Servers. The result is an aggregated address space 120 that represents all nodes from other servers on remote. At the end of the start phase the aggregating server 100 uses a data file to configure the data propagation and the control logic 102. This data file describes the input/output relations between nodes of the aggregated address space 120 and nodes that represent the control logic 102 within the aggregated address space 120. The nodes that represent control logic 102 consist of a single node that represents the control logic 102 as such and nodes representing the input [1 ... n] 106 and output [1 ... n] 108 of the control logic 102 interface nodes. The aggregating server 100 knows the nodes in the aggregated address space 120 that are proxies of nodes in the remote address space 124. The aggregating server 100 can synchronize the proxy—nodes with their respective counterparts in the address spaces on remote. The file-described input/output relations tell the aggregating server 100 how to synchronize values between proxy nodes as it describes the relation between proxy nodes and interface nodes (e.g., the relation IF node 2 Proxy—node 1 in FIG. 1). The combination of the aggregation-based data synchronization and the data forwarding-based synchronization allows to forward a data change from one server to another server, involving control logic 102 in between. The execution of the control logic 102 is triggered by a data change on the input side. Subscriptions enable the aggregating server 100 to detect changes on the input side. if a single logic function is connected to other inputs the aggregating server 100 refreshes the current values by reading current values from remote through the proxy nodes. The aggregating server 100 runs the programmed logic operations using the up-to-date consistent input data image, generating output data that is propagated along configured input/output relations. The aggregating server 100 forwards calculated results to the nodes on remote through the proxy nodes.

Thus, instead of forwarding services by a client, the logic operations of the control logic 102 forward the node data in a fast and efficient way.

FIG. 1 further shows a third interface node 134, a third proxy node 126, and a third node 128 of an aggregated server 132 in the remote space 124, to which the forwarding may be applied in the same way as described for the second node 118.

Figure 2:
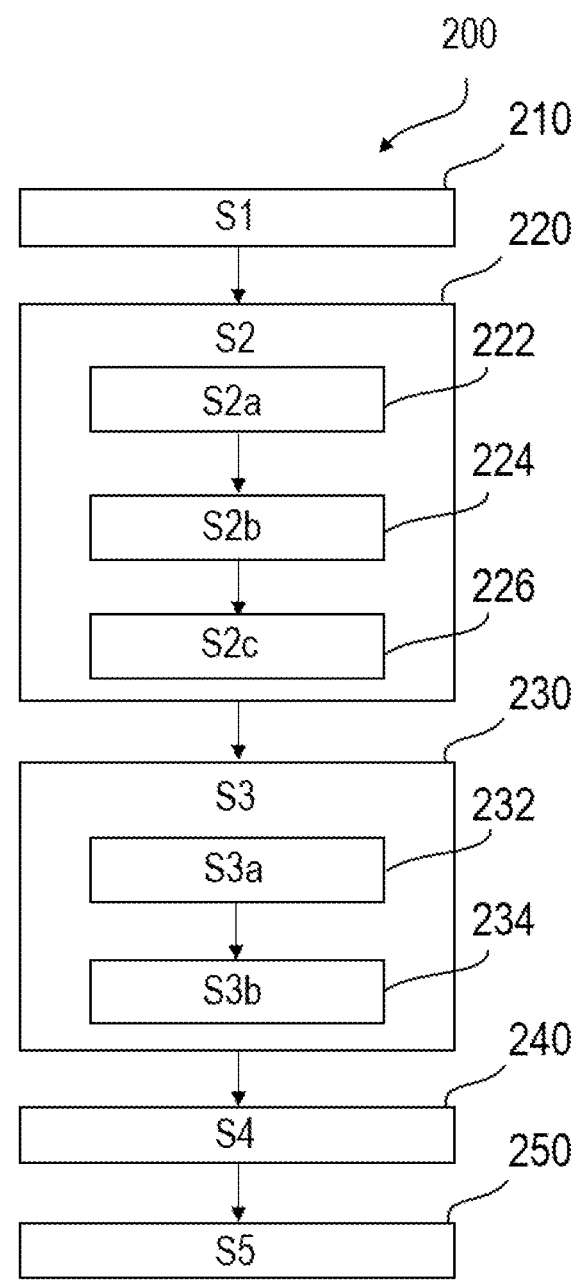
FIG. 2 shows a flow diagram of method for forwarding node data according to an embodiment.

FIG. 2 shows a method 200 for forwarding node data of a first node 116 in a remote address space 124 to a second node 118 in a remote address space 124. The method comprises the following steps:

S1: Aggregating 210, by an aggregating server 100, node data of the first node 116 and the second node 118. This step is performed during start-up of the system. The first node may be a source node, whose data is to be forwarded. For example, the first node may store sensor measurement data, which shall be provided to an actuator of a machine controller or the first node may be a value of a correcting variable and the second node represents the local input correcting variable for controlling a valve. When aggregating, the remote address space is browsed or scanned in a first step, and in a second step, S2, proxy nodes are created in the address space 200 of the aggregating server 100. Thus, S2 comprises:

S2: Creating 220, by the aggregating server 100, a first proxy node 112 comprising node data of the first node 116, and a second proxy node 114 comprising node data of the second node 118. The proxy nodes may be a copy of the nodes in the remote address space, or they may contain the same data but represented in another way. For example, the detected nodes may be grouped or they may be represented according their type, instance and structure information. As a further example, the units of physical values may be unitized.

Step 2, comprises step S2a: Determining 222 a relation between the first proxy node 112 and the second proxy node 114 by reading reference information. The reference information may be stored in the first proxy node and in the second proxy node. Alternatively, the reference is stored in a reference node or is read from a configuration file.

The information regarding the input/output relationship may be stored in the node or may be configured in a configuration file, from which the input/output relationship may be read and stored in the first 112 and second 114 proxy nodes. Thus, step S2b comprises: Determining 224 the input/output relationship by reading and evaluating meta information of the first proxy node 112; the meta information describing a read permission. Correspondingly, step S2c comprises: Determining 226 the input/output relationship by reading and evaluating meta information of the second proxy node; the meta information describing a write permission. Further proxy nodes may exist. Therefore, steps S2a to S2c may be performed for theses further proxy nodes, so that input/output relationships of proxies related to each other according to the reference information and according to the meta information can be determined. This allows to forward node data from a proxy node with read permission to several further proxy nodes or nodes in the remote address space, respectively, that have write permissions.

When the system is running, a node may be monitored. The monitoring can be caused by a configured activation of a monitoring service for this node. Data changes trigger a synchronization of the monitored node in the remote address space with its corresponding proxy node and a reception of the data at the corresponding interface node. Thus, the next steps are:

S3: Receiving 230 node data from the first proxy node 112 at the first interface node 106, by the aggregating server 100, according to an input/output relationship included in the first proxy node 112 between the first proxy node 112 and the first interface node 106. The triggering may be performed by a OPC UA standard service or by the control logic 102. Step S3 includes the following steps:

S3a: Detecting 232 a data change at the first node 116 and upon the detection of the data change performing step S3b: Synchronizing 234 the first node 116 with the first proxy node 112 and triggering the reception as described for step S3.

Step S4 comprises providing 240, by the aggregating server 100, the node data of the first interface node 106 to a second interface node 108. The provisioning is based on the input/output relationship and the references, which were determined in steps S2a, 2b and 2c.

Finally, the node data is forwarded in step S5, which is: Forwarding 250, by the aggregating server 100 100, the node data of the first interface node 106 to the second proxy node 114, according to the input/output relationship between the second interface node 108 and the second proxy node 114 and the second node 118.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An aggregating server comprising a control logic, a first and a second proxy node in an aggregated address space,
    wherein the aggregating server is an Open Platform Communications Unified Architecture (OPC UA) aggregating server;
    wherein the first proxy node corresponds to a first node in a remote address space of an aggregated server, and a second proxy node corresponds to a second node in the remote address space of an aggregated server;
    wherein the control logic is configured to forward node data from the first node in the remote address space via the first proxy node and the second proxy node to the second node in the remote address space according to an input/output relationship;
    wherein the first proxy node and the second proxy node comprise meta information;
    wherein the meta information describes whether a data type of a proxy node is read data type or write data type;
    wherein the input/output relationship between an interface node and a proxy node is defined by the read- or write data type such that an interface node has an input relationship with respect to the proxy node if the meta information describes a read data type for the proxy node data, and an interface node has an output relationship with respect to the proxy node if the meta information describes is a write data type for the proxy node data;
    and the first proxy node data is of read data type and the second proxy node is of write data type;
    wherein further a reference in the aggregating address space defines a relationship between the first proxy node and the second proxy node; and
    wherein the first proxy node is defined as forwarding source of the node data to be forwarded according to the input/output relationship between the first interface node and the first proxy node, and the reference; and
    wherein the second proxy node is defined as forwarding target of the node data to be forwarded according to the input/output relationship between the second interface node and the second proxy node, and the reference.

2. The aggregating server according to claim 1, wherein the control logic comprises a control logic node and the control logic node is configured to receive the node data from the first proxy node via a first interface node and to forward the node data to the second proxy node according to the input/output relationship.

3. The aggregating server according to claim 1,
    wherein the control logic further comprises a synchronization module;
    wherein the synchronization module is configured to synchronize the node data of the first proxy node with the node data of the first node in the remote address space before the forwarding is executed, and to provide the node data to the second proxy node and the second node when the forwarding is executed.

4. The aggregating server according to claim 1,
    wherein the first proxy node and the second proxy node comprise meta information;
    wherein the meta information describes whether data has read or write permission;
    wherein an input/output relationship between an interface node and a proxy node is defined by the read or write permission of a proxy node data, and the first proxy node has read permission and the second proxy node has write permission;
wherein further a reference in the aggregating address space defines a relationship between the first proxy node and the second proxy node; and
wherein the first proxy node is defined as forwarding source of the node data to be forwarded according to an input/output relationship between the first interface node and the first proxy node, and the reference; and
wherein the second proxy node is defined as forwarding target of the node data to be forwarded according to an input/output relationship between the second interface node and the second proxy node, and the reference.

5. The aggregating server according to claim 1, wherein the aggregating server further comprises an input-output configuration file;
wherein the input-output configuration file comprises a data type definition of the first proxy node and the second proxy node, and/or references; and
wherein the control logic is further configured to read the input-output configuration file data and to forward the node data from the first node to the second node according to the file data.

6. A method for forwarding node data of a first node in a remote address space to a second node in the remote address space, comprising:
S1: aggregating, by an Open Platform Communications Unified Architecture (OPC UA) aggregating server, node data of the first node and the second node;
S2: creating, by the OPC UA aggregating server, a first proxy node comprising node data of the first node, and a second proxy node comprising node data of the second node, wherein step S2 comprises:
S2a: determining a relation between the first proxy node and the second proxy node by reading reference information;
S2b: determining the input/output relationship by reading and evaluating meta information of the first proxy node; the meta information describing a read data type such that the first interface node has an input relationship with respect to the first proxy node; and
S2c: determining the input/output relationship by reading and evaluating meta information of the second proxy node; the meta information describing a write data type such that the second interface node has an output relationship with respect to the second proxy node;
S3: receiving node data from the first proxy node at a first interface node, by the OPC UA aggregating server, according to an input/output relationship included in the first proxy node between the first proxy node and the first interface node;
S4: providing, by the OPC UA aggregating server, the node data of the first interface node to a second interface node; and
S5: forwarding, by the OPC UA aggregating server, the node data of the first proxy node via the first interface node, the second interface node, and the second proxy node to the second node in the remote space, according to the input/output relationship between the second interface node and the second proxy node and the second node and a reference in the aggregating address space defining a relationship between the first proxy node and the second proxy node.

7. The method according to claim 6, wherein step S3, receiving node data from the first proxy node at a first interface node, by the aggregating server, according to an input/output relationship included in the first proxy node between the first proxy node and the first interface node comprises:
S3a: detecting a data change at the first node:
S3b: synchronizing the first node with the first proxy node and triggering receiving node data from the first proxy node at a first interface node, by an aggregating server, according to an input/output relationship included in the first proxy node between the first proxy node and the first interface node.

8. A non-transitory computer-readable medium having processor-executable instructions stored thereon for forwarding node data of a first node in a remote address space to a second node in the remote address space, wherein the processor-executable instructions, when executed, facilitate:
S1: aggregating, by an Open Platform Communications Unified Architecture (OPC UA) aggregating server, node data of the first node and the second node;
S2: creating, by the OPC UA aggregating server, a first proxy node comprising node data of the first node, and a second proxy node comprising node data of the second node, wherein step S2 comprises:
S2a: determining a relation between the first proxy node and the second proxy node by reading reference information;
S2b: determining the input/output relationship by reading and evaluating meta information of the first proxy node; the meta information describing a read data type such that the first interface node has an input relationship with respect to the first proxy node; and
S2c: determining the input/output relationship by reading and evaluating meta information of the second proxy node; the meta information describing a write data type such that the second interface node has an output relationship with respect to the second proxy node;
S3: receiving node data from the first proxy node at a first interface node, by the OPC UA aggregating server, according to an input/output relationship included in the first proxy node between the first proxy node and the first interface node;
S4: providing, by the OPC UA aggregating server, the node data of the first interface node to a second interface node; and
S5: forwarding, by the OPC UA aggregating server, the node data of the first proxy node via the first interface node, the second interface node, and the second proxy node to the second node in the remote space, according to the input/output relationship between the second interface node and the second proxy node and the second node and a reference in the aggregating address space defining a relationship between the first proxy node and the second proxy node.

* * * * *